(12) United States Patent
Richards

(10) Patent No.: US 6,385,723 B1
(45) Date of Patent: *May 7, 2002

(54) KEY TRANSFORMATION UNIT FOR AN IC CARD

(75) Inventor: Timothy Philip Richards, Herts (GB)

(73) Assignee: Mondex International Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/075,974

(22) Filed: May 11, 1998

Related U.S. Application Data

(60) Provisional application No. 60/046,514, filed on May 15, 1997.

(51) Int. Cl.[7] .................................................. H04L 9/00
(52) U.S. Cl. ...................... 713/160; 713/172; 380/278; 380/282; 380/285
(58) Field of Search ............................... 713/160, 172; 380/278–285

(56) References Cited

U.S. PATENT DOCUMENTS

| | | | |
|---|---|---|---|
| 4,214,230 A | 7/1980 | Fak et al. |
| 4,218,582 A | 8/1980 | Hellman et al. |
| 4,259,720 A | 3/1981 | Campbell |
| 4,302,810 A | 11/1981 | Bouricius et al. |
| 4,305,059 A | 12/1981 | Benton |
| 4,321,672 A | 3/1982 | Braun et al. |
| 4,341,951 A | 7/1982 | Benton |
| 4,405,829 A | 9/1983 | Rivest et al. |
| 4,408,203 A | 10/1983 | Campbell |
| 4,423,287 A | 12/1983 | Zeidler |
| 4,442,345 A | 4/1984 | Mollier et al. |
| 4,453,074 A | 6/1984 | Weinstein |
| 4,467,139 A | 8/1984 | Mollier |
| 4,498,000 A | 2/1985 | Decavele et al. |
| 4,536,647 A | 8/1985 | Atalla et al. |

(List continued on next page.)

FOREIGN PATENT DOCUMENTS

| | | |
|---|---|---|
| EP | 0152024 | 8/1985 |
| EP | 0157303 | 10/1985 |
| EP | 0190733 | 8/1986 |
| EP | 0218176 | 4/1987 |
| EP | 0261030 | 3/1988 |
| EP | 0275510 | 7/1988 |
| EP | 0292248 | 11/1988 |
| EP | 0328289 | 8/1989 |
| EP | 0354793 | 2/1990 |
| EP | 0451936 | 10/1991 |
| EP | WO9116691 | 10/1991 |
| EP | 0466969 | 1/1992 |
| EP | 0475837 | 3/1992 |
| EP | 0537756 | 4/1993 |
| EP | 0540095 | 5/1993 |

(List continued on next page.)

OTHER PUBLICATIONS

Schneier, "Applied Cryptography, 2nd Edition, "Chptr 3, Sec. 3.1, p. 51, 1996.*
Davies et al., "Security for Computer Networks: An Introduction to Data Security in Teleprocessing and Electronic Funds Transfer," John Wiley & Sons 1984.

*Primary Examiner*—Albert Decady
*Assistant Examiner*—Steve Kabakoff
(74) *Attorney, Agent, or Firm*—Baker Botts L.L.P.

(57) ABSTRACT

A multi-application IC card system and method is disclosed providing a secure data transmission technique. The method is used, for example, to load an application from an application provider, which could be remote, to an IC card. At least a portion of the application is encrypted using a transfer key. The transfer key is then encrypted using the public key of a public/secret key pair of the intended IC card to form a key transformation unit. The encrypted application and key transformation unit are then sent to the IC card and the IC card decrypts the key transformation unit using its secret key. The transfer key is then recovered and used to decrypt the encrypted application. The application can then by stored on the IC card and accessed by the card user.

74 Claims, 10 Drawing Sheets

U.S. PATENT DOCUMENTS

| | | |
|---|---|---|
| 4,578,530 A | 3/1986 | Zeidler |
| 4,605,820 A | 8/1986 | Campbell, Jr. |
| 4,629,872 A | 12/1986 | Hällberg |
| 4,630,201 A | 12/1986 | White |
| 4,650,978 A | 3/1987 | Hudson et al. |
| 4,669,596 A | 6/1987 | Capers et al. |
| 4,705,211 A | 11/1987 | Honda et al. |
| 4,709,136 A | 11/1987 | Watanabe |
| 4,709,137 A | 11/1987 | Yoshida |
| 4,727,243 A | 2/1988 | Savar |
| 4,727,244 A | 2/1988 | Nakano et al. |
| 4,731,842 A | 3/1988 | Smith |
| 4,734,568 A | 3/1988 | Watanabe |
| 4,736,094 A | 4/1988 | Yoshida |
| 4,742,215 A | 5/1988 | Daughters et al. |
| 4,745,267 A | 5/1988 | Davis et al. |
| 4,746,788 A | 5/1988 | Kawana |
| 4,748,557 A | 5/1988 | Tamada et al. |
| 4,748,668 A | 5/1988 | Shamir et al. |
| 4,752,677 A | 6/1988 | Nakano et al. |
| 4,757,185 A | 7/1988 | Onishi |
| 4,757,534 A * | 7/1988 | Matyas et al. ............... 705/56 |
| 4,757,543 A | 7/1988 | Tamada et al. |
| 4,759,063 A | 7/1988 | Chaum |
| 4,759,064 A | 7/1988 | Chaum |
| 4,767,920 A | 8/1988 | Kitta et al. |
| 4,778,983 A | 10/1988 | Ushikubo |
| 4,785,166 A | 11/1988 | Kushima |
| 4,786,790 A | 11/1988 | Kruse et al. |
| 4,797,542 A | 1/1989 | Hara |
| 4,797,920 A | 1/1989 | Stein |
| 4,798,941 A | 1/1989 | Watanabe |
| 4,802,218 A | 1/1989 | Wright et al. |
| 4,803,347 A | 2/1989 | Sugahara et al. |
| 4,811,393 A | 3/1989 | Hazard |
| 4,816,653 A | 3/1989 | Anderl et al. |
| 4,816,654 A | 3/1989 | Anderl et al. |
| 4,825,052 A | 4/1989 | Chemin et al. |
| 4,827,512 A * | 5/1989 | Hirokawa et al. ........... 713/191 |
| 4,831,245 A | 5/1989 | Ogasawara |
| 4,833,595 A | 5/1989 | Iijima |
| 4,839,504 A | 6/1989 | Nakano |
| 4,839,792 A | 6/1989 | Iijima |
| 4,849,614 A | 7/1989 | Watanabe et al. |
| 4,853,522 A | 8/1989 | Ogasawara |
| 4,853,961 A | 8/1989 | Pastor |
| 4,874,935 A | 10/1989 | Younger |
| 4,877,945 A | 10/1989 | Fujisaki |
| 4,877,947 A | 10/1989 | Mori |
| 4,879,747 A | 11/1989 | Leighton et al. |
| 4,882,474 A | 11/1989 | Anderl et al. |
| 4,887,234 A | 12/1989 | Iijima |
| 4,891,503 A | 1/1990 | Jewell |
| 4,891,506 A | 1/1990 | Yoshimatsu |
| 4,900,904 A | 2/1990 | Wright et al. |
| 4,901,276 A | 2/1990 | Iijima |
| 4,906,828 A | 3/1990 | Halpern |
| 4,907,270 A | 3/1990 | Hazard |
| 4,926,480 A | 5/1990 | Chaum |
| 4,935,962 A | 6/1990 | Austin |
| 4,949,257 A | 8/1990 | Orbach ....................... 364/401 |
| 4,961,142 A | 10/1990 | Elliott et al. |
| 4,969,188 A | 11/1990 | Schöbi |
| 4,977,595 A | 12/1990 | Ohta et al. |
| 4,984,270 A | 1/1991 | LaBounty |
| 4,985,615 A | 1/1991 | Iijima |
| 4,987,593 A | 1/1991 | Chaum |
| 4,993,068 A | 2/1991 | Piosenka et al. |
| 4,995,081 A | 2/1991 | Leighton et al. |
| 4,996,711 A | 2/1991 | Chaum |
| 5,001,753 A | 3/1991 | Davio et al. |
| 5,003,594 A | 3/1991 | Shinagawa |
| 5,005,200 A | 4/1991 | Fischer |
| 5,010,239 A | 4/1991 | Mita |
| 5,012,074 A | 4/1991 | Masada |
| 5,012,076 A | 4/1991 | Yoshida |
| 5,016,274 A | 5/1991 | Micali et al. |
| 5,038,025 A | 8/1991 | Kodera |
| 5,068,894 A | 11/1991 | Hoppe |
| 5,081,678 A * | 1/1992 | Kaufman et al. ............ 713/161 |
| 5,093,862 A | 3/1992 | Scwartz |
| 5,097,115 A | 3/1992 | Ogasawara et al. |
| 5,120,939 A | 6/1992 | Claus et al. |
| 5,128,997 A | 7/1992 | Pailles et al. |
| 5,131,038 A | 7/1992 | Puhl et al. |
| 5,142,578 A | 8/1992 | Matyas et al. |
| 5,146,499 A | 9/1992 | Geffrotin |
| 5,148,481 A | 9/1992 | Abraham et al. |
| 5,161,231 A | 11/1992 | Iijima |
| 5,162,989 A | 11/1992 | Matsuda ..................... 364/401 |
| 5,163,098 A | 11/1992 | Dahbura |
| 5,164,988 A | 11/1992 | Matyas et al. |
| 5,165,043 A | 11/1992 | Miyahara et al. |
| 5,166,503 A | 11/1992 | Mizuta |
| 5,175,416 A | 12/1992 | Mansvelt et al. |
| 5,180,901 A | 1/1993 | Hiramatsu |
| 5,191,193 A | 3/1993 | Le Roux |
| 5,191,608 A | 3/1993 | Geronimi |
| 5,200,999 A | 4/1993 | Matyas et al. |
| 5,201,000 A | 4/1993 | Matyas et al. |
| 5,202,922 A * | 4/1993 | Iijima ........................... 380/45 |
| 5,214,702 A | 5/1993 | Fischer |
| 5,224,162 A | 6/1993 | Okamoto et al. |
| 5,243,175 A | 9/1993 | Kato |
| 5,247,578 A | 9/1993 | Pailles et al. |
| 5,293,577 A | 3/1994 | Hueske et al. |
| 5,311,595 A * | 5/1994 | Bjerrum et al. ............. 713/169 |
| 5,371,797 A | 12/1994 | Bocinsky, Jr. |
| 5,420,405 A | 5/1995 | Chasek |
| 5,436,970 A * | 7/1995 | Ray et al. ...................... 380/23 |
| 5,452,431 A | 9/1995 | Bournas |
| 5,473,690 A | 12/1995 | Grimonprez et al. |
| 5,485,520 A | 1/1996 | Chaum et al. |
| 5,511,121 A | 4/1996 | Yacobi |
| 5,517,011 A | 5/1996 | Vandenergel |
| 5,530,232 A | 6/1996 | Taylor |
| 5,533,123 A * | 7/1996 | Force et al. ................. 713/189 |
| 5,534,857 A | 7/1996 | Laing et al. |
| 5,539,825 A | 7/1996 | Akiyama et al. |
| 5,542,081 A | 7/1996 | Geronimi |
| 5,544,246 A | 8/1996 | Mandelbaum et al. |
| 5,546,523 A | 8/1996 | Gatto |
| 5,552,897 A * | 9/1996 | Mandelbaum et al. ...... 358/400 |
| 5,553,139 A * | 9/1996 | Ross et al. ..................... 705/59 |
| 5,557,516 A | 9/1996 | Hogan |
| 5,574,269 A | 11/1996 | Mori et al. |
| 5,578,808 A | 11/1996 | Taylor |
| 5,581,708 A | 12/1996 | Iijima |
| 5,588,146 A | 12/1996 | Leroux |
| 5,633,932 A * | 5/1997 | Davis et al. ................... 380/25 |
| 5,682,027 A | 10/1997 | Bertina et al. |
| 5,692,132 A | 11/1997 | Hogan |
| 5,699,528 A | 12/1997 | Hogan |
| 5,704,046 A | 12/1997 | Hogan |
| 5,705,798 A | 1/1998 | Tarbox |
| 5,708,780 A | 1/1998 | Levergood et al. |
| 5,715,314 A | 2/1998 | Payne et al. |
| 5,721,778 A * | 2/1998 | Kubota et al. ............... 380/212 |
| 5,724,424 A | 3/1998 | Gifford |
| 5,796,831 A | 8/1998 | Paradinas et al. |
| 5,798,507 A * | 8/1998 | Kawagishi et al. .......... 235/380 |

| | | | | | | |
|---|---|---|---|---|---|---|
| 5,872,848 A | * | 2/1999 | Romney et al. ............... 380/25 | FR | 2667171 | 3/1992 |
| 5,903,650 A | * | 5/1999 | Ross et al. .................... 705/59 | FR | 2687816 | 8/1993 |
| 5,974,141 A | * | 10/1999 | Saito ............................. 380/4 | GB | 2284689 | 6/1995 |
| 6,009,173 A | * | 12/1999 | Sumner ...................... 713/156 | WO | WO8707062 | 11/1987 |
| 6,055,314 A | * | 4/2000 | Spies et al. ................. 380/228 | WO | WO8809019 | 11/1988 |
| 6,061,449 A | * | 5/2000 | Candelore et al. ............ 380/28 | WO | WO9005960 | 5/1990 |
| 6,230,267 B1 | * | 5/2001 | Richards et al. ............ 713/172 | WO | WO9213322 | 8/1992 |

FOREIGN PATENT DOCUMENTS

| | | |
|---|---|---|
| EP | 0559205 | 8/1993 |
| EP | 0594493 | 4/1994 |
| EP | 0636998 | 2/1995 |
| EP | 0647902 | 4/1995 |
| EP | 0666550 | 8/1995 |
| EP | 0686947 | 12/1995 |
| EP | 0751460 | 1/1997 |
| FR | 2536928 | 6/1984 |
| WO | WO9320538 | 10/1993 |
| WO | WO9321612 | 10/1993 |
| WO | WO9619771 | 6/1996 |
| WO | WO9628795 | 9/1996 |
| WO | WO9638825 | 12/1996 |
| WO | WO9843212 | 10/1998 |
| WO | WO9910824 | 3/1999 |
| WO | WO9916031 | 4/1999 |

* cited by examiner

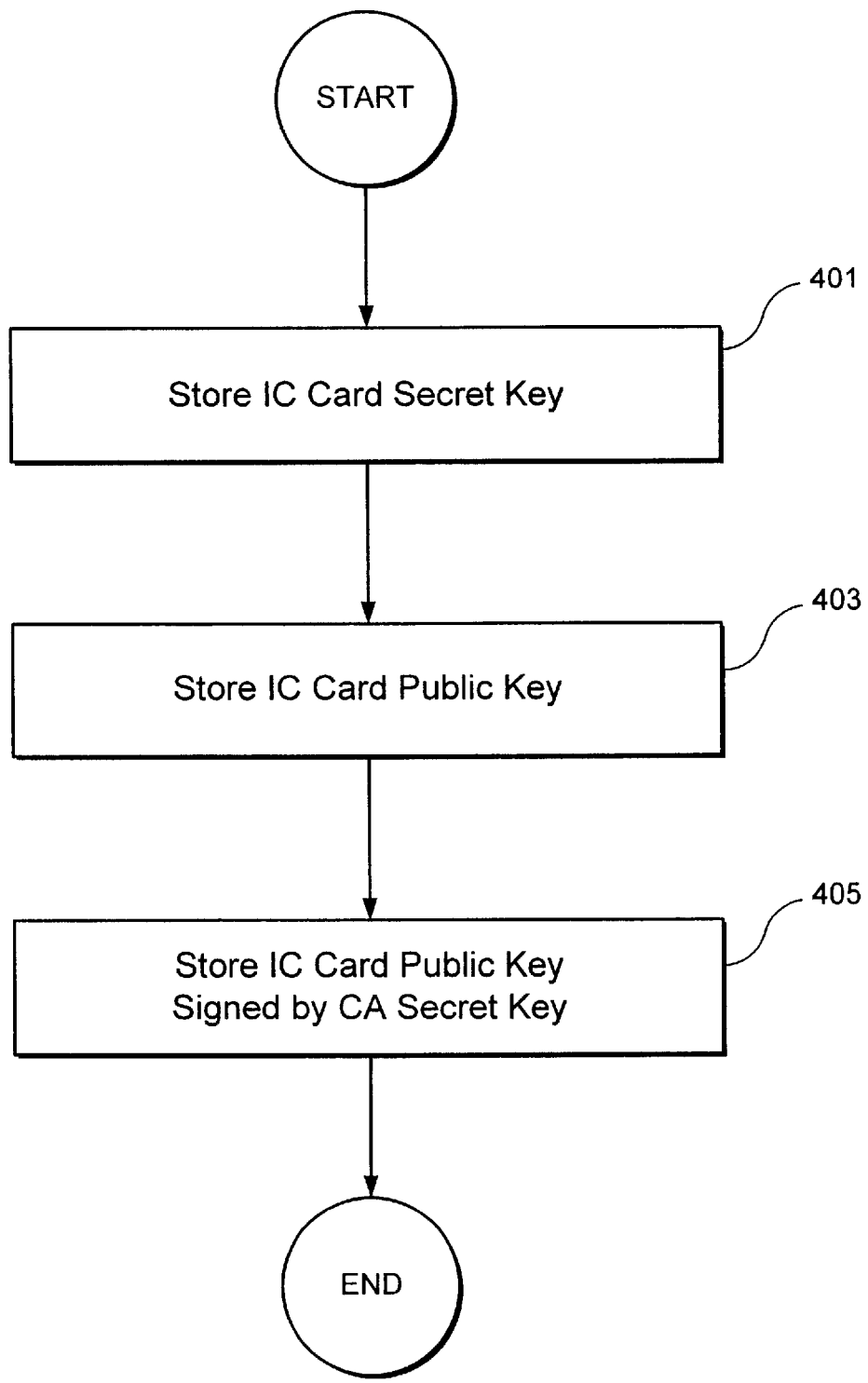
F I G. 4

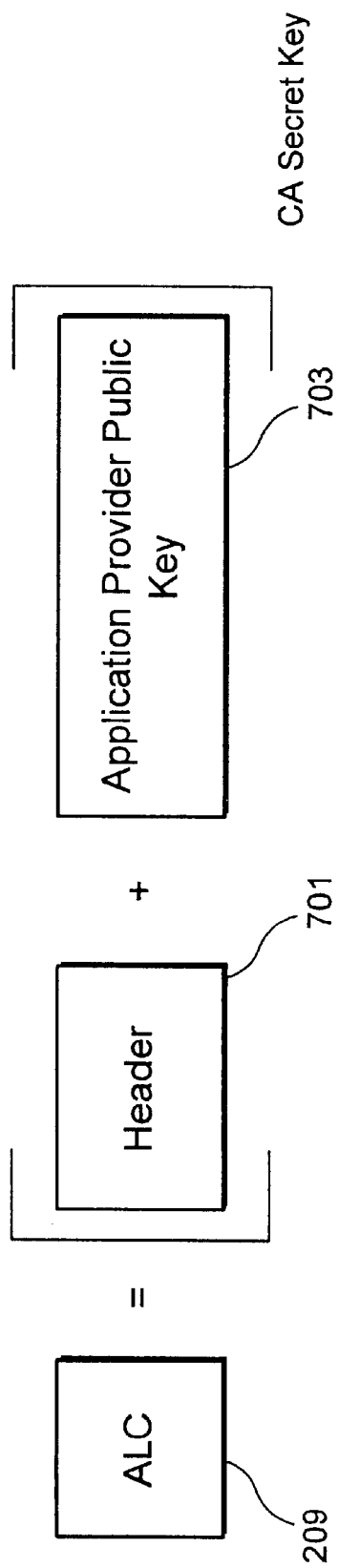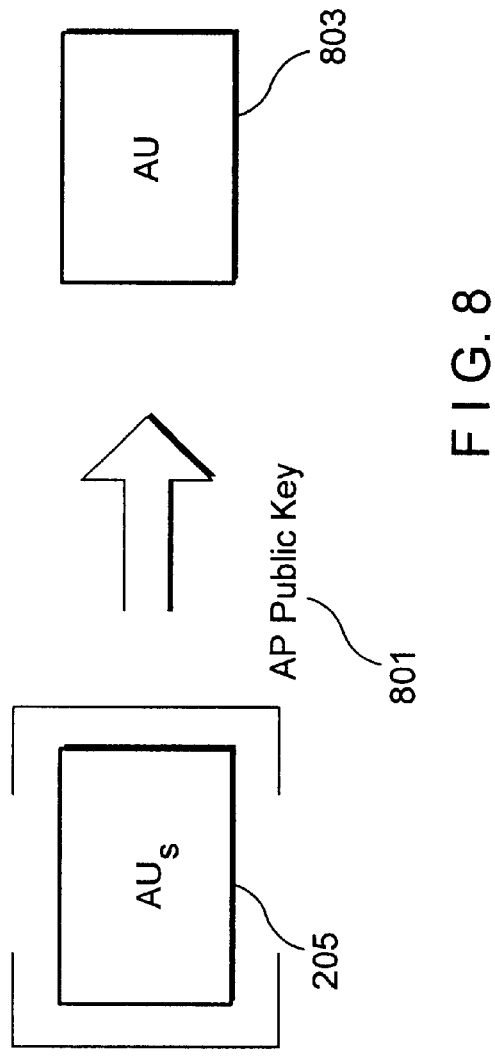
FIG. 7
FIG. 8

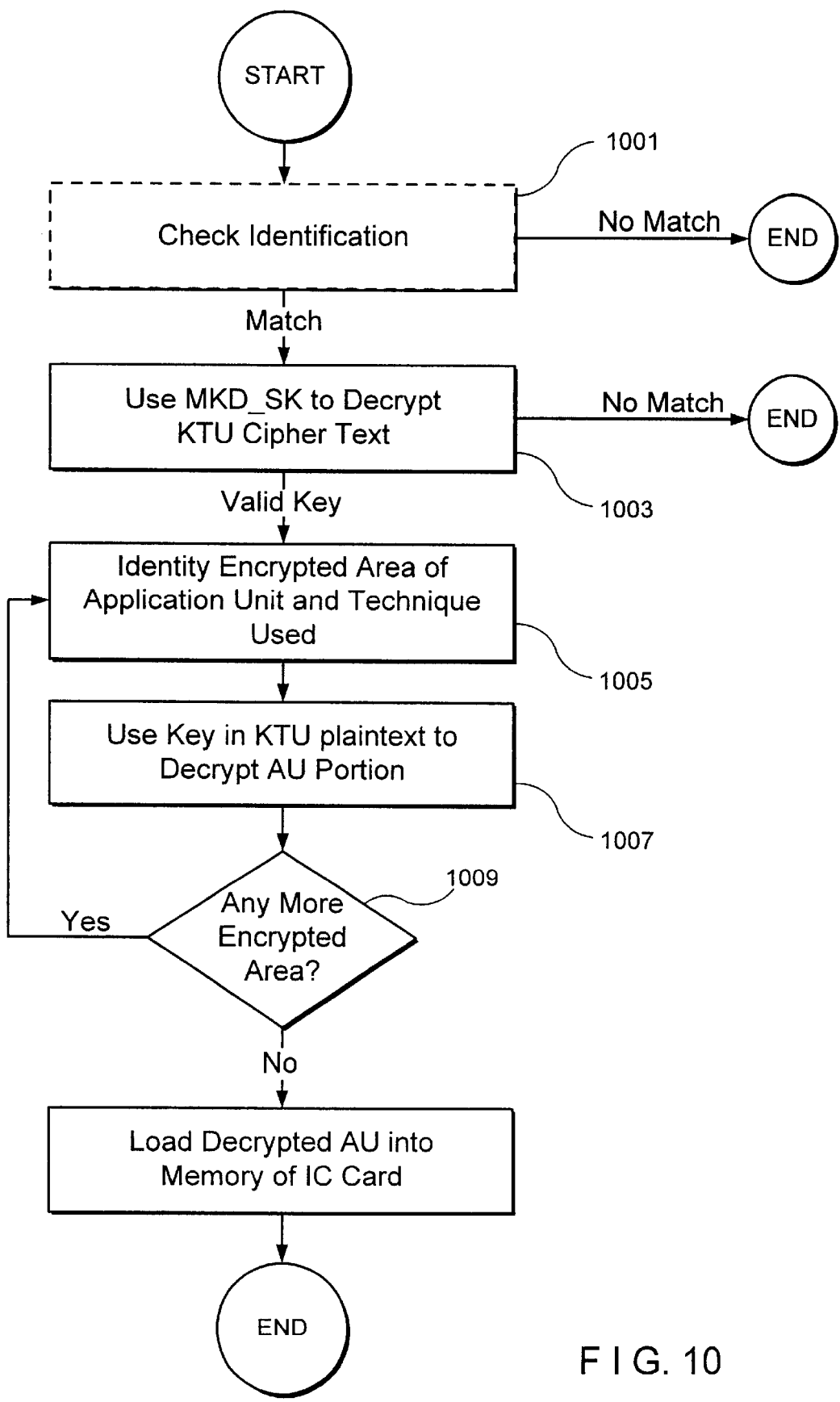
F I G. 10

KEY TRANSFORMATION UNIT FOR AN IC CARD

PRIORITY APPLICATION

This application claims priority to U.S. Provisional application No. 60/046,514 filed on May 15, 1997, and entitled "Design for a Multi Application Smart Card", which is hereby incorporated by reference.

RELATED APPLICATION

This application is related to U.S. application Ser. No. 09/075,973 filed on May 11, 1998, entitled "IC Card Transportation Key Set," and assigned to Mondex International Limited, which is hereby incorporated by reference.

BACKGROUND OF INVENTION

Integrated circuit ("IC") cards are becoming increasingly used for many different purposes in the world today. An IC card (also called a smart card) typically is the size of a conventional credit card which contains a computer chip including a microprocessor, read-only-memory (ROM), electrically erasable programmable read-only-memory (EEPROM), an Input/Output (I/O) mechanism and other circuitry to support the microprocessor in its operations. An IC card may contain a single application or may contain multiple independent applications in its memory. MULTOS™ is a multiple application operating system which runs on IC cards, among other platforms, and allows multiple applications to be executed on the card itself. This allows a card user to run many programs stored in the card (for example, credit/debit, electronic money/purse and/or loyalty applications) irrespective of the type of terminal (i.e., ATM, telephone and/or POS) in which the card is inserted for use.

A conventional single application IC card, such as a telephone card or an electronic cash card, is loaded with a single application when it is manufactured and before it is given to a card user. That application, however, cannot be modified or changed after the card is issued even if the modification is desired by the card user or card issuer. Moreover, if a card user wanted a variety of application functions to be performed by IC cards issued to him or her, such as both an electronic purse and a credit/debit function, the card user would be required to carry multiple physical cards on his or her person, which would be quite cumbersome and inconvenient. If an application developer or card user desired two different applications to interact or exchange data with each other, such as a purse application interacting with a frequent flyer loyalty application, the card user would be forced to swap multiple cards in and out of the card-receiving terminal, making the transaction difficult, lengthy and inconvenient.

Therefore, it is beneficial to store multiple applications on the same IC card. For example, a card user may have both a purse application and a credit/debit application on the same card so that the user could select which type of payment (by electronic cash or credit card) to use to make a purchase. Multiple applications could be provided to an IC card if sufficient memory exists and an operating system capable of supporting multiple applications is present on the card. Although multiple applications could be preselected and placed in the memory of the card during its production stage, it would also be beneficial to have the ability to load and delete applications for the card post-production as needed.

The increased flexibility and power of storing multiple applications on a single card create new challenges to be overcome concerning the integrity and security of the information (including application code and associated data) exchanged between the individual card and the application provider as well as within the entire system when loading and deleting applications. It would be beneficial to have the capability in the IC card system to exchange data among cards, card issuers, system operators and application providers securely and to load and delete applications securely at any time from a local terminal or remotely over a telephone line, Internet or intranet connection or other data conduit. Because these data transmission lines are not typically secure lines, a number of security and entity authentication techniques must be implemented to make sure that applications being sent over the transmission lines are not tampered with and are only loaded on the intended cards.

As mentioned, it is important—particularly where there is a continuing wide availability of new applications to the cardholder—that the system has the capability of adding applications onto the IC card subsequent to issuance. This is necessary to protect the longevity of the IC cards; otherwise, once an application becomes outdated, the card would be useless. It would be beneficial to allow the addition of applications from a remote location as well as from a direct connection to an application provider's terminal. For example, it would be beneficial for a card user to be able to plug his IC card into his home computer and download an application over the Internet. This type of remote loading of applications raises a number of security risks when transmitting the application code and related data over an unsecured communications line such as the Internet. At least three issues need to be addressed in a system which provides such a capability.

The first issue is to make sure that the IC card receiving the application is the intended IC card and not another IC card. The second issue is determining how the IC card can authenticate that the application came from the proper application provider and not an unknown third party. The third issue concerns preventing third parties from reading the application and making an unauthorized copy. If a portion of the application is encrypted to address the latter issue, the intended IC card needs to have access to the correct key to decrypt the application. In a system with many IC cards and additionally many application providers, a secure key transfer technique is required so that the intended IC card can use the correct key for the application which is received. These concerns are raised by both remote application loading as well as local terminal application loading.

Accordingly, it is an object of this invention to provide a key transfer and authentication technique and specifically to provide a secure IC-card system that allows for the secure transfer of smart card applications which may be loaded onto IC cards.

SUMMARY OF THE INVENTION

These and other objectives are achieved by the present invention which provides an IC card system and method for securely loading an application onto an IC card including providing a secret and public key pair for the IC card, encrypting at least a portion of the application using a transfer key, encrypting the transfer key using the IC card's public key to form a key transformation unit, transmitting the encrypted application and the key transformation unit to the IC card, decrypting the key transformation unit using the IC card's secret key to provide the transfer key, decrypting the encrypted application using the provided transfer key and storing the decrypted application on the IC card.

In a preferred embodiment, the secure loading system and method allows the application provider to encrypt two or more portions of the application to be transmitted with two or more different keys, encrypt the two or more keys with the public key of the IC card to form a key transformation unit including the locations of the encrypted portions. Both the encrypted application and the key transformation unit are sent to the IC card. Because the decryption keys are encrypted with the IC card's public key, only the IC card's secret key can decrypt the key transformation unit. The transfer keys and the locations of the encrypted portions are recovered from the decrypted key transformation unit and the application is decrypted using the recovered transfer keys. This ensures that only the intended IC card can decrypt and use the application which was transmitted to that IC card.

In a preferred embodiment, an application load certificate is also sent to the IC card which is receiving the application. The application load certificate contains the public key of the application provider encrypted by the secret key of the certificate authority ("CA"), or the entity that manages the overall security of the IC card system. The IC card then uses a certificate authority public key to make sure that the certificate was valid by attempting to verify the application load certificate with the CA's public key. The IC card then uses the recovered application provider's public key to verify that the application provider was in fact the originator of the application by verifying the sent application signature generated with the application provider's corresponding secret key.

BRIEF DESCRIPTION OF THE DRAWINGS

Further objects, features and advantages of the invention will become apparent from the following detailed description taken in conjunction with the accompanying figures showing illustrative embodiments of the invention, in which

FIG. 4 is a flow chart of the steps for providing an individual key set for an IC card;

FIG. 7 is a graphic representation of the Application Load Certificate;

FIG. 8 is a graphic representation of the Application Unit being decrypted;

FIG. 10 is a flowchart illustrating the steps undertaken in processing the KTU.

Figure 1:
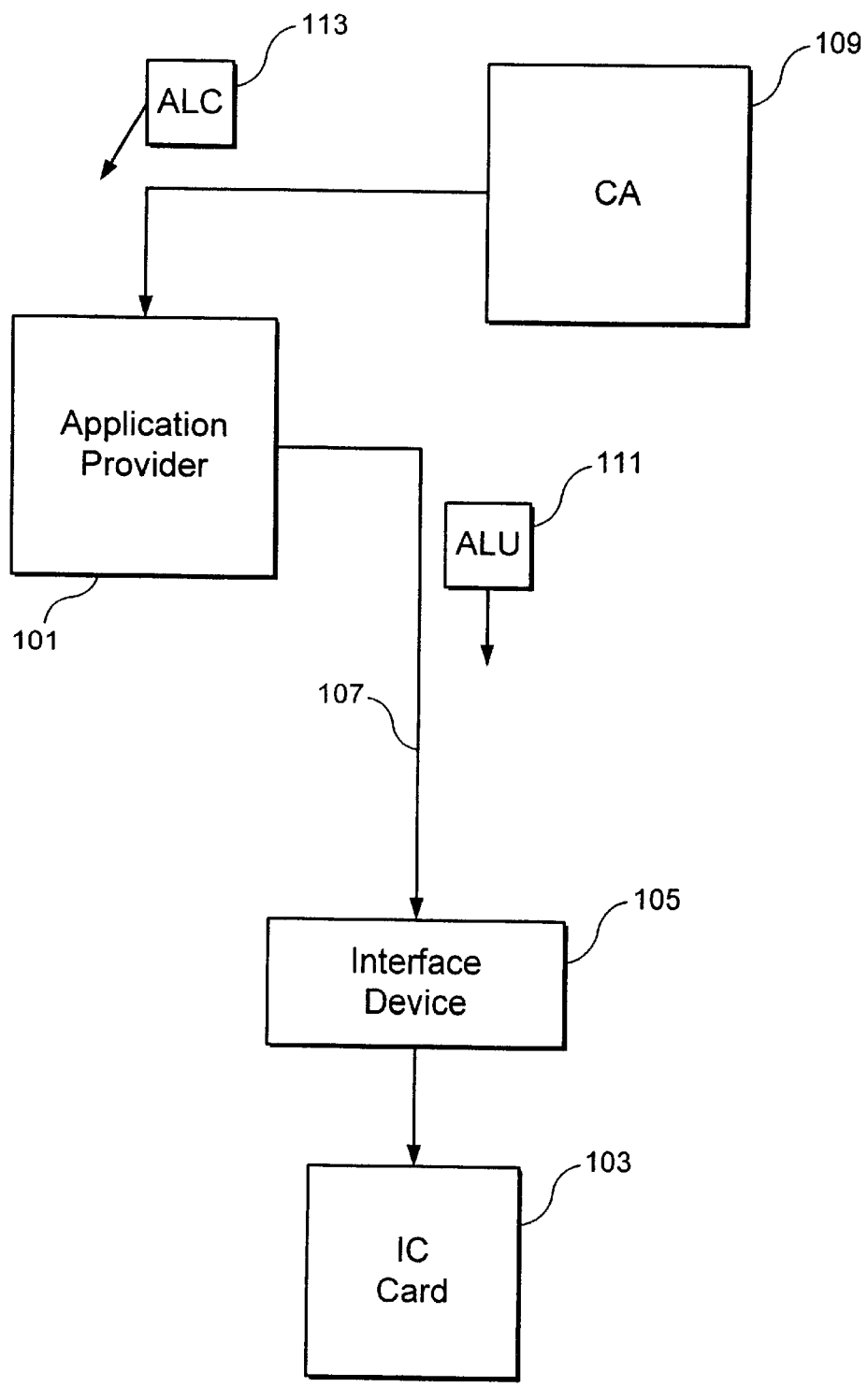
FIG. 1 is block diagram of the application loading system which loads an application from an application provider to an IC card.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

It is beneficial to have the capability to load applications onto IC cards containing multiple application operating systems at any time during the lifetime of the IC card. This flexibility allows a user of a card to periodically add new applications to the IC card and also allows older applications to be updated with newer versions of the application when they are released. For example, a card user may start with an IC card that contains a purse, or electronic cash application (e.g., MONDEX™), being stored on his IC card. Some time after the user has the card, he or she may load an additional application onto the card such as a credit/debit application. Some time after loading the credit/debit application on the card, a new version of the credit/debit application may become available and the card user should be able to erase the old application on his IC card and replace it with the new version of the credit/debit application which may contain additional features.

The flexibility of loading applications at different times during the IC card's life cycle creates security issues with the process of loading applications onto the card. In a multiple application operating system environment, it is beneficial to be able to load applications both at terminals, such as a bank ATM machine, as well as over remote communication links, such as telephone lines, cable lines, the Internet, satellite or other communications means. When loading applications onto an IC card, the application provider and the card issuer (which could be the same entity) needs to provide security regarding the applications to be loaded. First, the application provider must make sure the application is only sent to the correct card user who is intended to receive the application. One solution to this problem is addressed in a related application entitled "Secure Multi-Application IC Card System Having Selective Loading and Deleting Capability" by Everett et al., filed Feb. 12, 1998 and assigned to Mondex International, which is hereby incorporated by reference. Two additional security concerns also need to be addressed when loading an application from a remote source, or even from a local terminal, onto an IC card. First, the source of the application must be authenticated as the proper originator so that applications which may contain viruses or simply take up the limited storage memory in an IC card are not allowed to be loaded onto an IC card. Second, the application and associated data may contain private or trade secret information which needs to be encrypted so other people cannot view the contents of the encrypted application code and data. A portion of the application code and data may be secret while other portions are not. These concerns of authentication and protecting the contents of some or all of the application and associated data being loaded onto a card is addressed herein.

A number of encryption/decryption techniques are described herein. There are two basic types of encryption, symmetric encryption and asymmetric encryption. Symmetric encryption uses a secret key as part of a mathematical formula which encrypts data by transforming the data using the formula and key. After the data is encrypted, another party can decrypt the encrypted data using the same secret key with a related decryption algorithm. Thus the same key is used for encryption and decryption so the technique is symmetric. A conventional example of a symmetric algorithm is DES.

Asymmetric encryption techniques use two different keys of a pair for encrypting and decrypting information. The two keys are normally referred to as a private or secret key and a public key. When data is encrypted with one key of the pair, the other key is used to decrypt the data. If a sender of data signs the data with his secret key, anyone with the public key can verify the message. Since public keys are typically known to the public, the contents of a data signed with a secret key cannot be protected but the origination of the data can be verified by determining if a particular secret key signed the data. This authentication process is termed a digital signature. If person A wanted to authenticate a message he was sending to person B, the person A would sign the document with his secret key. When person B received the message, he would use person A's public key to decipher the message. If the message was readable after the public key was applied to it, person B would know that the document was signed with secret key of person A. Thus, the origin of the message has been authenticated.

The asymmetric key set can also be used to protect the contents of a message. If person A wanted to send an encrypted message to person B that no one else could read, he would encrypt the data or message with person B's public key and send it to person B. Now only the holder of B's secret key could decrypt the data. If a combination of keys is used, a person could both authenticate and encrypt the message. The asymmetric pair of keys has some powerful applications with respect to card security and is more robust than symmetric encryption. However, asymmetric encryption is more processor costly that symmetric encryption. A example of an asymmetric encryption method is RSA.

A hybrid of symmetric encryption which makes the encryption method more powerful is to encrypt data using two symmetric keys. This technique is called triple DES which encodes data with symmetric key 1, decodes the data using symmetric key 2 (which in effect further encodes the data) and then further encodes the data using key 1 again. Once the data has arrived at its destination, key 1 is used to decode the data, key 2 is used to encode the data, and key 1 is used to decode the data. These extra steps of encoding and decoding make the technique more powerful and more difficult to properly decipher without both keys.

FIG. 1 shows a block diagram of the entities used in a secure remote application loading process. The application provider 101 can be a card issuer, bank or other entity which provides application loading services. The application provider 101 initiates an application loading process onto IC card 103. Application Provider 101 is connected to data conduit 107 which is connected to interface device 105 (e.g., a terminal that communicates with an IC card). Data conduit 107 can be a telephone line, an intranet, the Internet, a satellite link or any other type of communications link. The application provider 101, which is remotely located from the IC card 103, desires to send and load an application to the IC card. However, because the data link is an open link and subject to third parties possibly intercepting or replacing applications being transmitted, security measures which authenticate the application itself, the application provider and the IC card must be used to ensure the integrity of the system. The Certificate Authority 109 may also be used to help authenticate that some data being transferred is part of an identified system.

In FIG. 1, the application provider sends an application load unit 111 to the interface device 105 and finally to IC card 103. The ALU includes the application itself and security data required to authenticate and protect the application code and associated data. The ALU is discussed specifically in FIG. 2 and in connection with the other figures herein. The ALU 111 also preferably contains Application Load Certificate (ALC) 113 data which is sent from the Certification Authority (CA) 109 to the application provider 101. The Certification Authority manages the overall security of the system by providing an Application Load Certificate for each application which is to be loaded onto an IC card. The application provider 101 and the IC card 103 both have individual public/secret keys sets provided to them. The authentication and security processes will now be described.

Figure 2:
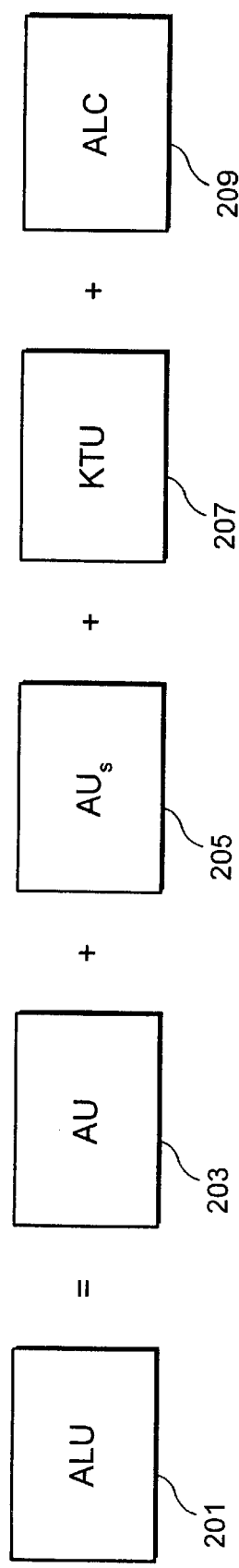
FIG. 2 is a graphic representation of the contents of an Application Loading Unit.

FIG. 2 shows a diagram illustrating the components of an Application Load Unit which is sent from the application loader to the IC card during the application load process. The Application Load Unit (ALU) 201 contains an Application Unit (AU) 203, an Application Unit Signature $(AU_s)$ 205, a Key Transformation Unit (KTU) 207 and an Application Load Certificate (ALC) 209. The ALU 201 is formatted in a conventional format used during data transmission. AU 203 contains the application code and data which are to be stored on the IC card, some or all of which is encrypted to protect a secret portion or portions of the code and/or data. AU 203 is described in further detail in connection with FIG. 3.

$AU_s$ 205 is the application code and data AU 203 digitally signed with the secret key of the application provider. The public key of the application provider is sent as part of the ALC 209 and is used to authenticate the application provider as the originator of the application. ALC 209 is made up of card identification information and the application provider's public key and is signed by the secret key of the certification authority. All these elements will be described in more detail below.

KTU 207 contains information relating to the encryption of the AU 203 (the code and data of the application) which allows the IC card to decrypt the designated portions so that the application and data can be accessed by the IC card but protects the data during transmission between the application provider and the IC card. KTU 207 is signed with a public key of the IC card for which the application is intended which ensures that only the intended IC card can decrypt the application code and data using the KTU information. This element will be described in connection with FIG. 5.

Figure 3:
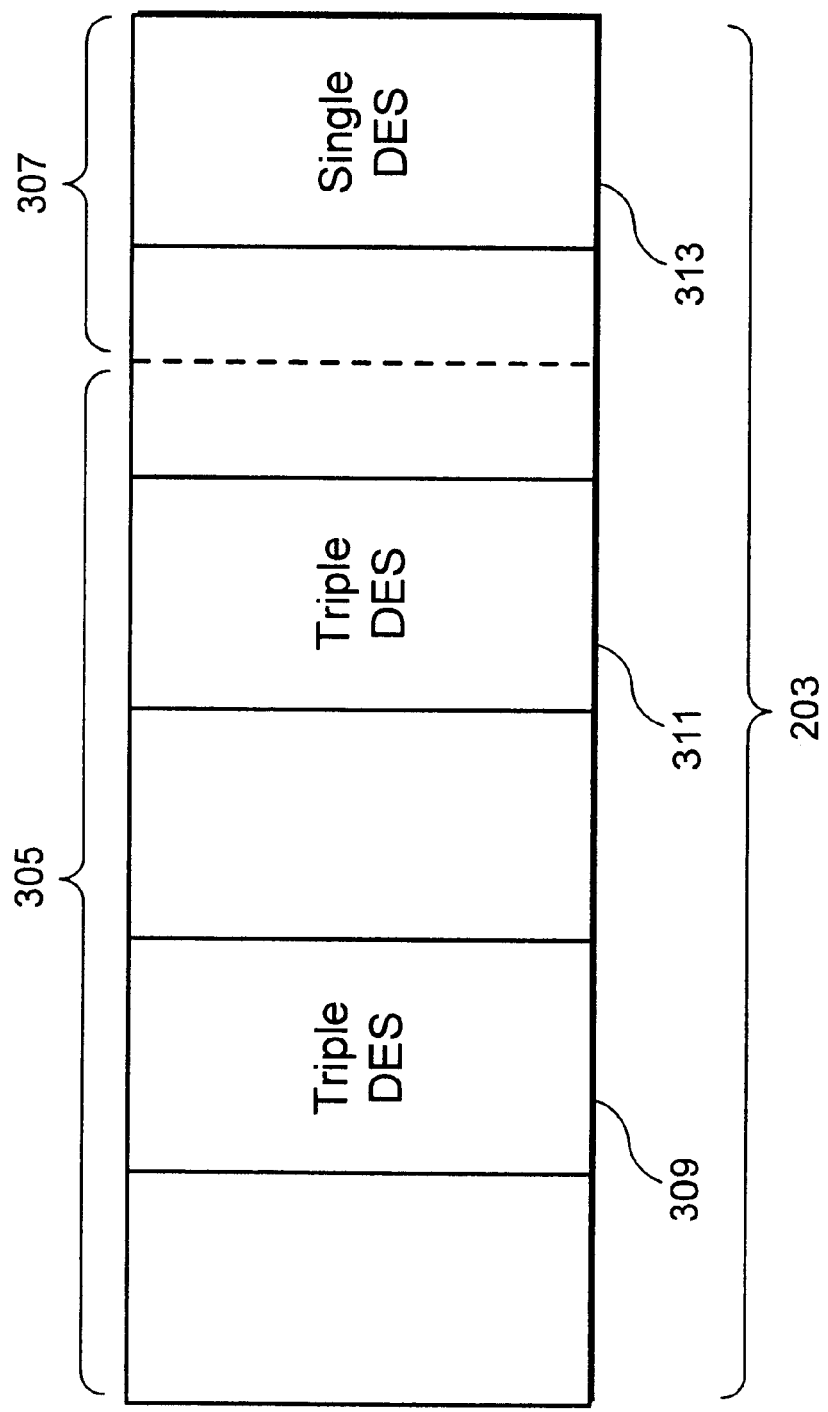
FIG. 3 is a graphic representation of an Application Unit.

FIG. 3 shows a graphic representation of the Application Unit 203 which is part of the application load unit. The AU 203 contains both the program code and associated data which is to be loaded onto the IC card of the card user. The program code consists of a number of program instructions which will be executed by the microprocessor on the IC card. The program instructions can be written in any programming language which the operating system stored on the IC card can interpret.

For example, in the MULTOS system the program can be written in MEL™ (MULTOS Executable Language). Most applications have associated data which must be loaded onto the card. For instance, data which identifies the card user such as a person's name or account number may be loaded in a secure manner with the credit/debit application. An application provider may provide electronic cash represented by data as a promotion when installing an electronic purse application. Some or all of this data is desired to be kept secret from third parties. Additionally, the application code itself may be considered proprietary and portions may be desired to be kept secret from others. The use of a Key Transformation Unit (KTU) will allow an application provider to designate and encrypt selected portions of its application as confidential and protect it from third parties.

Application Unit portion 305 indicates the program code which is to be transferred from the application provider to the IC card. Application Unit portion 307 indicates the associated data which is to be transferred as part of the application to be loaded onto the IC card. In this example, three discrete areas of the application unit are shown to be encrypted using either single DES or triple DES. Any number of variations regarding the portions encrypted and the type of encryption can be employed using the techniques described herein.

In this example, encrypted location 309 shows the first portion of the Application Unit 203 which has been encrypted using a triple DES technique. The encryption process as described above involves using a symmetrical key and the conventionally known DES algorithm to transform the data. The data can later be recovered by applying the key to the known DES algorithm. Encrypted location 311 shows a second portion of the application unit 203 which has been encrypted using triple DES. Encrypted location 313 shows a third portion which is encrypted using single DES. Single DES requires less computation to decrypt and takes up less space as part of the KTU as described below. If the application unit were intercepted by a third party while it was being transmitted from the application loader to the IC card, the encrypted portions could not be read unless the third party had the correct keys. That information, therefore, is protected in the KTU.

The KTU is used to allow the IC card for which the application and associated data is intended to decrypt the encrypted portions of the Application Unit by describing which portions of the application unit are encrypted, which encryption algorithm was used and the key or keys to be used to decipher the text. This information is highly confidential between the application provider and the intended IC card and therefore is protected in a manner unique to the intended card. In order to encrypt the KTU which is part of the overall ALU being transmitted, an individual key set for the particular intended IC card is used. The key set and its generation will now be described.

One of the security operations performed at the CA is to generate an individualized key set for each IC card which is stored on the card. The keys are used for off-card verification (i.e., to verify that the card is an authentic card) and for secure data transportation. The key generation process is shown generally in FIG. 4. The key set is made up of three different key data items: the card's secret key which is known only to the card, the card's public key which is stored on the card and the card's public key certificate which is the card's public key signed by one of the CA's secret keys. The individual keys of the key set are described in more detail below.

Step 401 stores a card specific transport secret key for the individual IC card in the memory of the card. This secret key is generated by the CA and loaded onto the card via a card acceptance device. Once stored on the card, the CA deletes from its own memory any data relating to the secret key. Thus, only the card itself knows its secret key. The data element containing the secret key information in the card is called "mkd_sk" which stands for MULTOS key data secret key.

Step 403 stores a card specific transport public key for the individual IC card in the memory of the card. This public key is preferably generated by the CA from the asymmetric encryption technique used to produce the secret key in step 401. The data element containing the card's public key information is called "mkd_pk" which stands for MULTOS key data public key.

Step 405 stores a card specific transport public key certificate for the individual IC card in the memory of the card. The data element containing the card's public key certificate information is called "mkd_pk_c" which stands for MULTOS key data public key certificate. This public key certificate is preferably generated by encrypting the transport public key mkd_pk with the secret key of the CA, indicated as follows:

$$\text{mkd\_pk c} = [\text{mkd\_pk}]_{CA\_sk}$$

which means the individual card's public key certificate is formed by applying the CA's secret key to the individual card's public key. The process is carried out at the CA. The public key certificate is retained by the CA so that it can regenerate the public key as needed.

A terminal can read the public key certificate from the IC cards to verify that the CA had signed and therefore approved the individual IC card. This is accomplished by verifying the public key certificate with the public component of the CA key set used to sign the mkd_pk. The decrypted public key certificate can then be compared with the public key to verify that the key certificate was certified (signed) by the CA.

Figure 5:
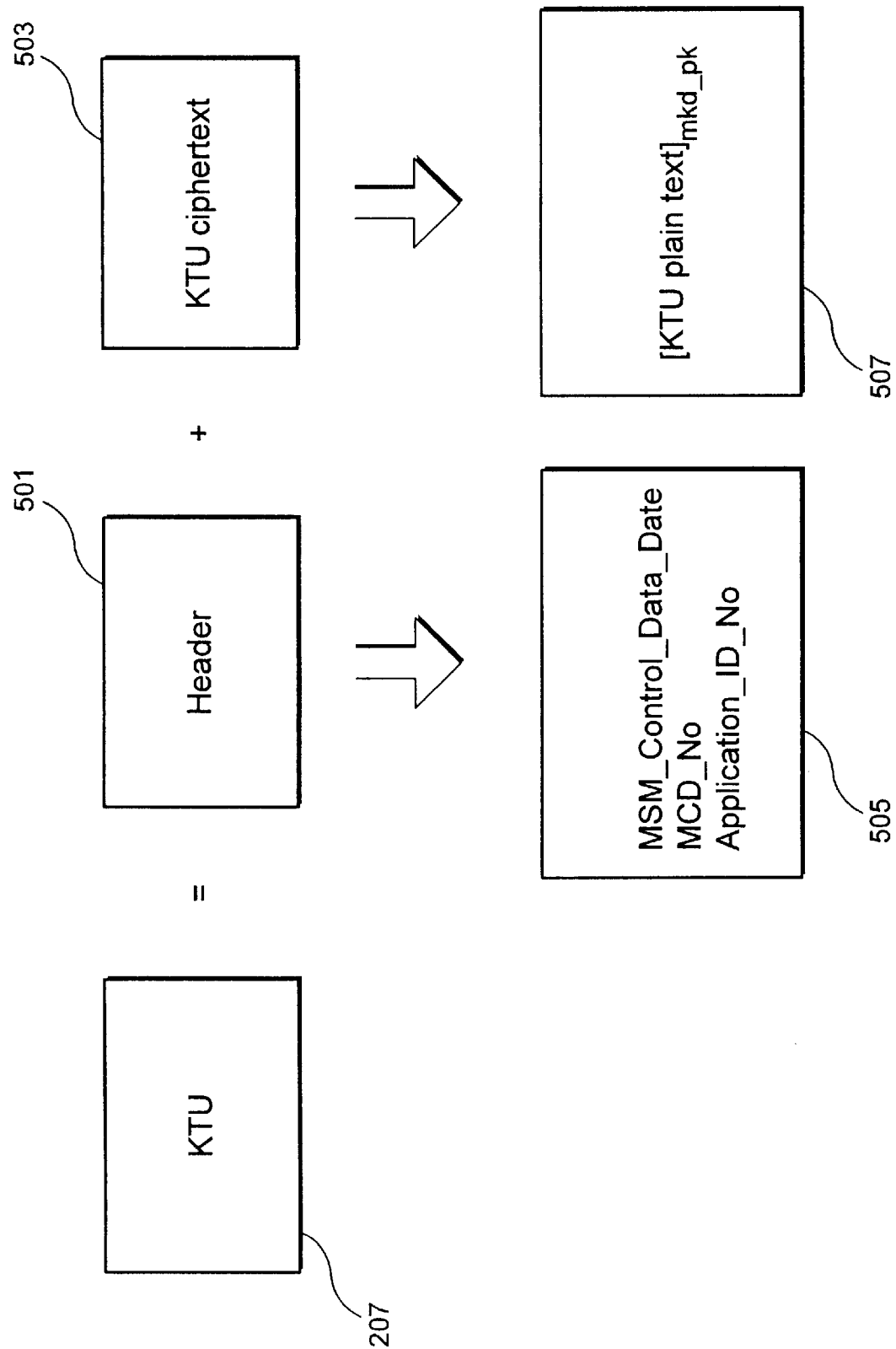
FIG. 5 is a graphic representation of a Key Transformation Unit.

FIG. 5 is a graphic depiction of the contents of KTU 207, which contains Header portion 501 and KTU Ciphertext portion 503. As shown in FIG. 5, header information 501 includes, for example, identifier or permissions information 505 such as the application_id_no (application identification number), mcd_no (IC card no) and/or msm_control_data_date (the date the IC card was issued). Additional identifiers could also be included. These identifiers allow the system to verify that the IC card which receives the ALU is the intended IC card. The permissions data is discussed in detail in the above referenced related application.

KTU Ciphertext 503 corresponds to KTU Plaintext (not encrypted) encrypted with the public key mkd_pk of the intended IC card as shown in box 507. The KTU Plaintext in further described in FIG. 6. The public key mkd_pk is obtained from the intended IC card by the application provider. The public key of an IC card is freely available to anyone and can be obtained directly from the card or from the CA. By signing the KTU Plaintext with the IC card public key, only the intended IC card can use its secret key of the public/secret key pair to decrypt the KTU Ciphertext. This means that only the intended IC card can determine the contents of the KTU plaint text, identify the encrypted portions of the application being loaded and use the keys provided to decrypt and recover the entire application and associate data. Because no other entity has the secret key of the IC card, the security and integrity of the program code and data being transmitted in ensured.

Figure 6:
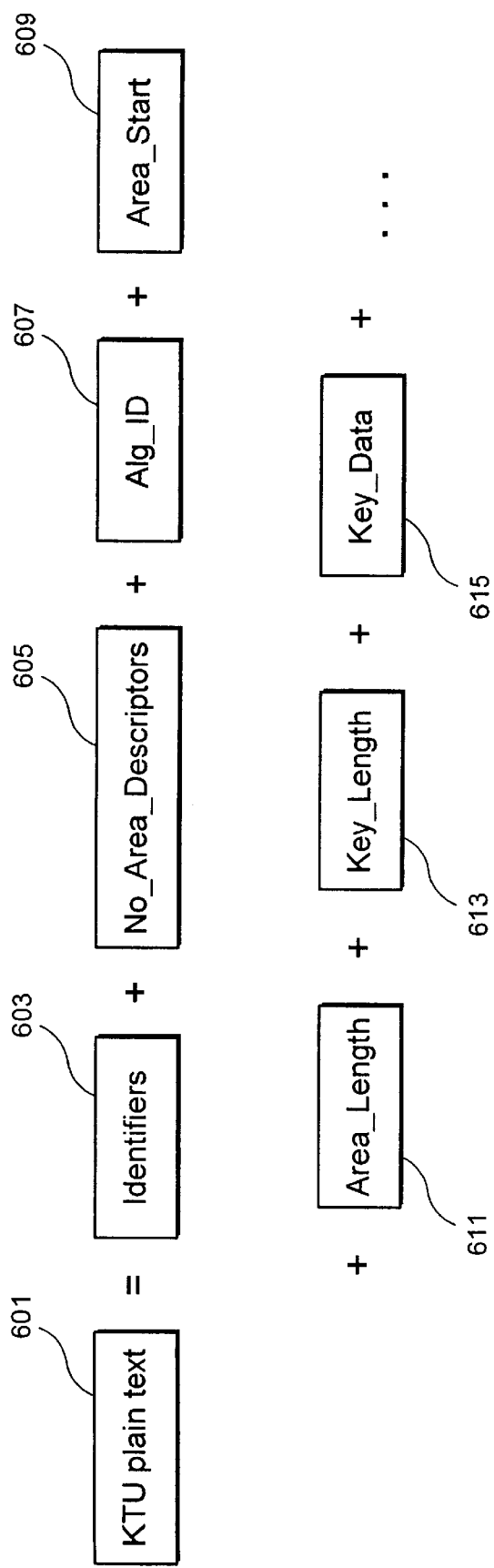
FIG. 6 is a graphic representation of a Key Transformation Unit plaintext.

FIG. 6 is a graphic representation of KTU Plaintext 601. KTU Plaintext 601 preferably includes identifier field 603, no_area_discriptors field 605, alg_id field 607, area_start field 609, area_length 611, key_length field 613, key_data field 615 and additional area and key fields depending upon the number of encrypted areas present in the Application Unit. Identifiers 603 contain identifying information of the Application Unit to which the KTU applies. No_area_descriptors 605 indicates how many different portions of the AU have been encrypted. In the example of FIG. 3, the number or area descriptors would be three. Field 607 contains the algorithm identifier for the first area which has been encrypted. The algorithm could be DES or triple DES, for example. Field 609 indicates the start of the first encrypted area. This indication could be an offset from the start of the AU. For example, the offset could be 100 which means that the first area starts at the $100^{th}$ byte of the Application Unit. Field 611 indicates the area length for the first encrypted portions. This field allows the microprocessor on the IC card to know how large an area has been encrypted and when coupled with the start of the area, allows the IC card microprocessor to decrypt the correct portion of the Application Unit. Filed 613 indicates the key length for the particular encrypted portion of the application unit. The length of the key will differ for different encryption techniques. The key length field allows the IC card to know the length of the key data. Field 615 indicates the key data for the particular encrypted portion. The key data is used with the algorithm identity and the location of the encoded portion to decode the encrypted portion. If more than one encrypted area is indicated, then additional data referring of the algorithm, start location, length, key length and key data will be present in the KTU Plaintext. While a number of fields have been described, not all the fields are necessary for the invention. The most important field, however, is the key data itself.

FIG. 7 is a graphic representation of the Application Load Certificate (ALC) 209. ALC 209 includes a header 701 and the Application Provider Public Key 703. Header 701 and Application Provider Public Key 703 are then signed (encrypted) with the CA secret key. Thus, the ALC 209 must be provided by the CA to the application provider for each application loaded because only the CA knows the CA private key. Header 701 contains information regarding the application provider and the IC card for which the application is intended. The ALC 209 is placed in the correct ALU by the application provider which can use the identification information. Application Provider Public Key 703 is provided to the CA along with the identification data. The CA then signs this information after verifying its authenticity and returns the signed ALC to the application provider. The IC card, when it receives the ALC 209 as part of the ALU 201, will open the ALC 209 with the public key of the CA. This ensures that the CA signed the application load certificate and that it is genuine. After decrypting the information, the header identification information 701 is checked and the application provider public key is recovered. This public key will be used to verify that the application and code which is to be loaded onto the IC card originated with the proper application provider.

FIG. 8 is a graphic representation of the use of the application provider's public key to decrypt the signed AU 205 in order to verify that AU 203 was signed by the application provider. AU signed 205 is verified with the Application Provider Public Key 801. The recovered AU 803 is then compared with AU 203. If the data blocks match, then the IC card has verified that the application provider signed (encrypted) the application unit and the application is genuine. This authentication is valid because only the application provider has its own secret key. The IC card can process this information because the application provider's public key is provided to it as part of the application load certificate 209 which is signed by the CA. Therefore, it does not need to retrieve the public key from an external location to authenticate the application.

Figure 9:
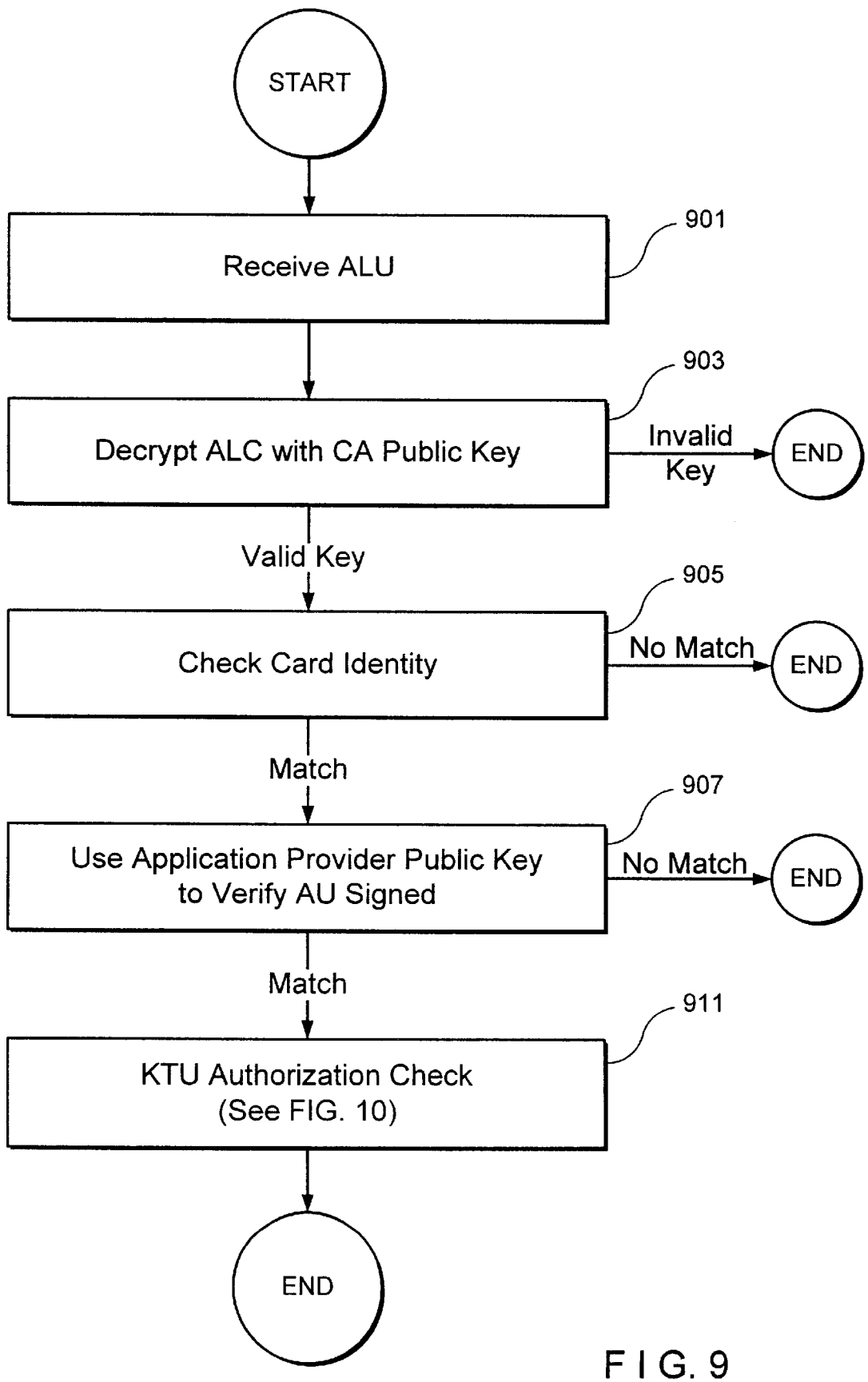
FIG. 9 is a flowchart illustrating the steps undertaken in processing the Application Load Unit.

FIG. 9 shows a flow chart of the steps for processing the Application Load Unit when it is received by the IC card. Prior to receiving the ALU, identity checks as to the identity of the IC card can be performed if desired. The ALU processing techniques provide a number of further verifications including verifying that the application being loaded is: (1) from the correct application provider, (2) being loaded on the intended card and (3) certified by the CA. The ALU processing techniques also allow the transportation of transport decryption keys which enable the IC card to decrypt portions of the program code and associated data in a secure manner. In step 901, the IC card receives the ALU from the application provider. The ALU can be transmitted via a terminal connection, contactless connection, telephone, computer, intranet, Internet or any other communication means. The ALU is placed in the EEPROM of the IC card along with header information indicating the starting addresses of AU 203, AU signed 205, the KTU 207 and ALC 209. Alternatively, the IC card could determine the relative address locations of these four units.

Step 903 decrypts the ALC 209 with the CA public key. Each IC card preferably stores in its memory a copy of the CA public key because it is used in many transactions. Alternatively, the IC card could obtain the public key from a known storage location. If the CA public key successfully verifies the ALC 209, then the IC card has verified that the CA has signed the ALC 209 with its secret key and thus the Application Load Certificate is proper. If the IC card cannot verify the ALC successfully, then the ALC was not signed by the CA and the certificate is not proper. The application loading process would then end.

Step 905 then checks the identity of IC card against the identification information sent in the application load certificate to make sure the card is intended to receive the application. This permissions checking is described in the related patent application identified above. If there is no match of identification data, the application loading process ends. If the identification data does match, then the process continues.

Step 907 uses the application providers public key which was recovered from the verified ALC to verify the AU signature 205. When the ALU was generated by the application provider, the application unit 203 was signed with the application provider's secret key. The application provider then provides its public key to IC card through the ALC. The IC card then verifies the AU signed 205. If the ALU is successfully verified, then it is accepted as having been generated by the application provider. Because the application provider's public key is part of the ALC which is signed by the CA, the CA can make sure that the proper public key has been provided to the IC card. This unique key interaction between the application provider, CA and the intended IC card ensures that no counterfeit or unapproved applications or data are loaded onto an IC card which is part of the secure system.

Step 911 then processes a KTU authentication check which further verifies that only the intended card has received the application. The KTU authentication check makes sure that if a third party does somehow intercept the ALU, the third party cannot read the enciphered portions of the AU and cannot retrieve the keys to decrypt the AU. This step is further explained in FIG. 10.

FIG. 10 shows the steps of the KTU Authentication process. Step 1001, which is shown in dashed lines because it is preferably optional, checks the identification of the IC card a second time. The identification information can be sent as part of the KTU data. However, this check is optional as it has already been performed once in step 905.

Step 1003 then decrypts KTU ciphertext 503 using the IC card's secret key (mkd_sk). The KTU Plaintext was previously encrypted using the intended card's public key (mkd_pk). This means that only the holder of the intended card's secret key could decrypt the encrypted message. The application provider obtains the intended IC card's public key either from the IC card itself (See FIG. 4 and related text for a discussion of the mkd key set) or from a database holding the public keys. If the IC card cannot decrypt the KTU ciphertext properly then the KTU is not meant for that card and the application loading process halts. If the IC card does properly decipher the KTU ciphertext, then the process continues.

Step 1005 identifies an encrypted area of the application unit (AU). In the example of the KTU Plaintext described in connection with FIG. 6, the IC card uses a relative starting address and area length field to determine the encrypted portion. Step 1005 also identifies which encryption technique was used to encrypt the identified portion so that the proper decryption technique can be used. For example, the technique could by single or triple DES. Alternatively, the technique could be a default technique used in the system and need not be identified.

Step 1007 then retrieves the key from KTU Plaintext and decrypts the identified portion with the identified decryption technique. This allows the IC card to have the decrypted portion of the AU which it will store in its static memory once all the encrypted portions have been decrypted.

Step 1009 checks if there are any other additional encrypted areas. In the example described in FIG. 3, there are three encrypted areas. The number of encrypted areas was a field in the example of FIG. 6. However, the number of portions can be determined using other conventional means. If there are additional encrypted portions, the process jumps to step 1005. If there are no additional encrypted portions, then the process continues with step 1011.

Step 1011 then loads the decrypted AU into the memory of the IC card. The ALU has passed all of the authentication and decryption checks and the application can now properly reside on the IC card and be executed and used by the card user. While the different checks have been presented in a particular order in FIGS. 9 and 10, the checks can be performed in any order. While all of the described techniques used in conjunction with the ALU provide the best security, one or more of the individual techniques could be used for their individual purposes or combined with other conventional security techniques.

Figure 11:
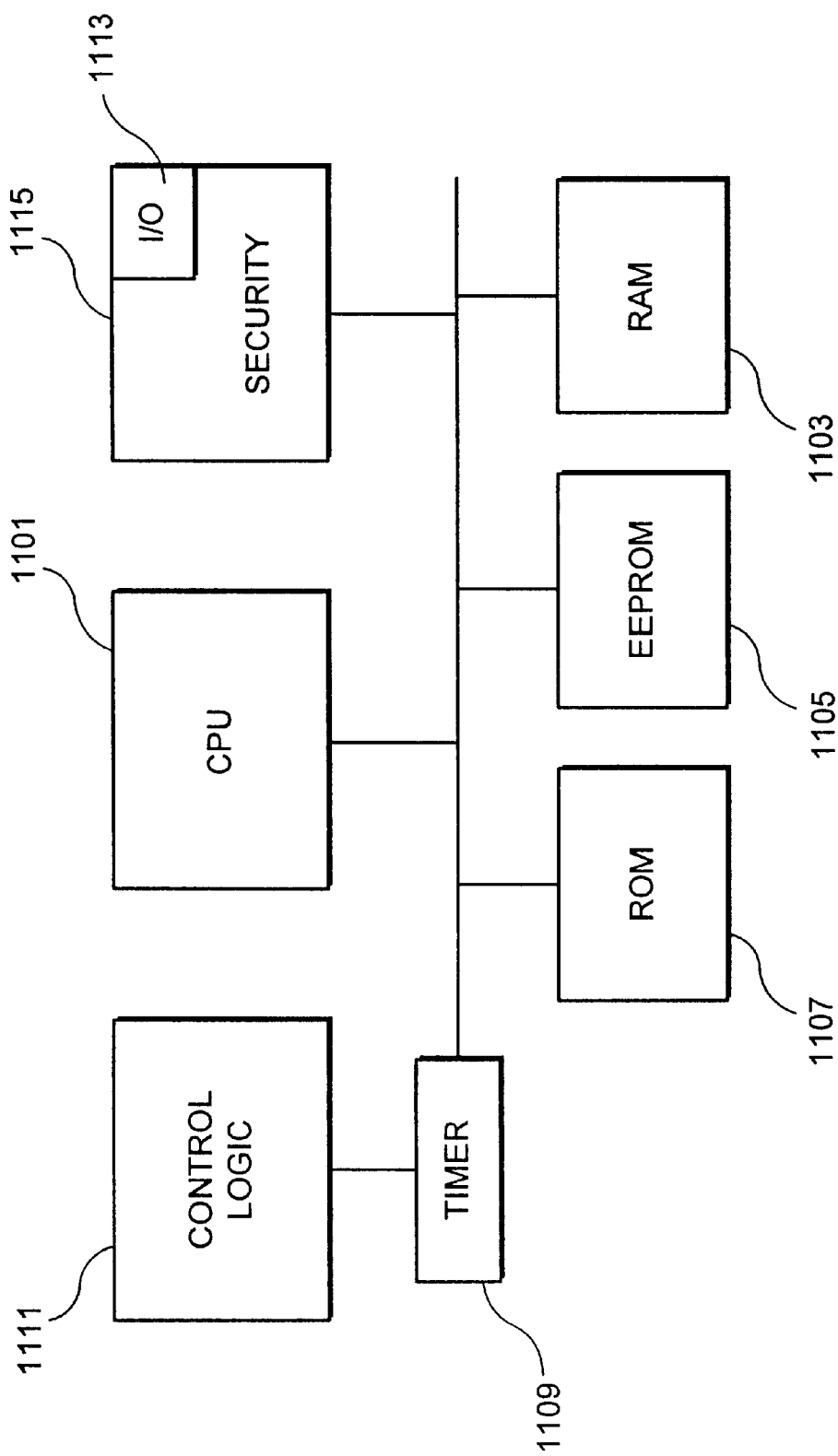
FIG. 11 is a block diagram showing the components of an IC card which can receive and process and Application Load Unit.

FIG. 11 shows an example of a block diagram of an IC card chip upon which an ALU can be loaded and processed. An integrated circuit is located on an IC card for use. The IC card preferably includes a central processing unit 1101, a RAM 1103, an EEPROM 1105, a ROM 1107, a timer 1109, control logic unit 1111, an I/O port 1113 and security circuitry 1115, which are connected together by a conventional data bus.

Control logic 1111 in memory cards provides sufficient sequencing and switching to handle read-write access to the card's memory through the input/output ports. CPU 1101 with its control logic can perform calculations, access memory locations, modify memory contents, and manage input/output ports. Some cards have a coprocessor for handling complex computations like performing cryptographic operations. Input/output ports 1113 are used under the control of a CPU and control logic, for communications between the card and a card interface device. Timer 1109 (which generates or provides a clock pulse) drives the control logic 1111 and CPU 1101 through the sequence of steps that accomplish memory access, memory reading or writing, processing, and data communication. A timer may be used to provide application features such as call duration. Security circuitry 1115 includes fusible links that connect the input/output lines to internal circuitry as required for testing during manufacture, but which are destroyed ("blown") upon completion of testing to prevent later access. The AU data after the ALU has been authenticated and verified is stored in EEPROM 1105. The authentication process as described herein is performed by the CPU 1101.

FIG. 11 also shows a possible configuration for the integrated circuit chip for the application provider and for the certification authority. CPU 1101 present in the IC chip for the application provider encrypts the necessary information using encryption techniques described herein and performs the necessary data operations. CPU 1101 at the certification authority is used to sign the Application Load Certificate as described herein.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, while loading an application is discussed herein, the same secure loading process can apply to transmitting other types of data such as data blocks, database files, word processing documents or any other type of data need to be transmitted in a secure manner.

I claim:

1. A method for securely loading an executable application from an application provider onto an IC card having a memory, subsequent to issuance of said IC card, over a communications network, comprising the steps of:

providing a secret key and public key pair for said IC card;

encrypting one or more portions of said executable application using an associated transfer key for each portion, each encrypted portion also having an associated location;

creating an application unit which comprises said encrypted portions;

encrypting said one or more transfer keys and said one or more associated locations using said IC card's public key;

forming a key transformation unit which comprises said one or more encrypted transfer keys and said one or more encrypted associated locations;

transmitting, from a remote location to said IC card, said application unit and said key transformation unit;

decrypting said key transformation unit on said IC card using said IC card's secret key to recover said one or more transfer keys and said one or more associated locations of said respective one or more encrypted portions;

identifying said encrypted application portions associated with said one or more recovered associated locations;

decrypting, on said IC card, said one or more encrypted portions of said executable application using the recovered associated transfer key for each encrypted portion; and storing said recovered executable application in said memory on said IC card for subsequent execution.

2. The method of claim 1, wherein said encryption technique using said transfer key is symmetric.

3. The method of claim 2, wherein said symmetric technique is DES.

4. The method of claim 1, wherein said IC card's public and private keys are provided using an asymmetric technique.

5. The method of claim 4, wherein said asymmetric technique is RSA.

6. The method of claim 1, wherein said key transformation unit further indicates the technique used to encrypt said one or more portions of said executable application.

7. The method of claim 1, further comprising the step of enciphering a second portion of said application exclusive of said one or more portions of said executable application.

8. The method of claim 7, wherein said second portion is encrypted using a second encryption technique and said key transformation unit indicates said second encryption technique.

9. The method of claim 7, wherein said second portion is encrypted using a second key and said key transformation unit indicates said second key.

10. The method of claim 8, wherein said key transformation unit indicates the associated location of said second portion of said executable application.

11. The method of claim 1, wherein said key transformation unit indicates the number of encrypted portions of said application.

12. The method of claim 1, further including the steps of providing a public key and secret key set for an application provider; providing a public and secret key set for a certification authority; encrypting said application provider's public key using said certification authorities' secret key to produce an application load certificate; further signing said encrypted application using said application provider's secret key to produce a signed application and transmitting said signed application and said application load certificate to said IC card.

13. The method of claim 12, further including the step of the IC card verifying said application load certificate with said certification authority's public key.

14. The method of claim 13, further including the steps of verifying the signed encrypted application using the application provider's public key from said decrypted application load certificate.

15. The method of claim 14, wherein said verified application signature is compared to sent encrypted application to determine if they are equivalent.

16. An IC card system, comprising:
    at least one IC card including a memory;
    an application provider providing an executable application to said at least one IC card;
    a communications link coupled to said at least one IC card and said application provider;
    a public key and secret key set generated for said IC card; and
    an arrangement generating one or more transport keys to be used by said application provider,
    wherein one or more portions of said executable application is encrypted by said application provider for each portion using said one or more transport keys; said one or more transport keys and said one or more associated locations being encrypted using said IC card's public key for each, each encrypted portion having an associated location,
    wherein a key transformation unit is formed, said key transformation unit comprising said one or more transport keys and said one or more encrypted associated locations,
    wherein said executable application and said key transformation unit are then transmitted to said IC card over said communications link from a remote location,
    wherein said transmitted key transformation unit is decrypted on said IC card using said IC card's private key to recover said one or more transport keys and said one or more associated locations of said respective one or more encrypted portions,
    wherein said one or more encrypted portions associated with said one or more recovered locations are identified,
    wherein said one or more respective encrypted portions of said transmitted application are decrypted on said IC card using said one or more recovered associated transport keys for each encrypted portion to recover said executable application, and
    wherein said recovered executable application is stored on said IC card for subsequent execution.

17. The system of claim 16, wherein said encryption technique using said transfer key is symmetric.

18. The system of claim 17, wherein said symmetric technique is DES.

19. The system of claim 16, wherein said IC card's public and private keys are provided using an asymmetric technique.

20. The system of claim 19, wherein said asymmetric technique is RSA.

21. The system of claim 16, wherein said key transformation unit further indicates the technique used to encrypt said one or more portions of said executable application.

22. The system of claim 16, further comprising the step of enciphering a second portion of said application independently of said one or more portions of said executable application.

23. The system of claim 22, wherein said second portion is encrypted using a second encryption technique and said key transformation unit indicates said second encryption technique.

24. The system of claim 22, wherein said second portion is encrypted using a second key and said key transformation unit indicates said second key.

25. The system of claim 22, wherein said key transformation unit indicates the location of said second portion of said application.

26. The system of claim 16, wherein said key transformation unit indicates the one or more associated locations of said one or more portions of said executable application.

27. The system of claim 16, wherein said key transformation unit indicates the number of encrypted portions of said application.

28. The system of claim 16, further including a certification authority, wherein a public key and secret key set is provided for an application provider; a public and secret key set is provided for said certification authority; said certificate authority's secret key is used to sign said application provider's public key to produce an application load certificate; said application provider's secret key is used to further sign said encrypted application to produce a signed encrypted application and said signed encrypted application and said application load certificate is transmitted to said IC card.

29. The system of claim 28, wherein the IC card verifies said application load certificate with said certification authority's public key.

30. The system of claim 29, wherein said IC card verifies the signed encrypted application using the application provider's public key from said verified application load certificate.

31. The system of claim 30, wherein said verified application signature is compared to said encrypted application to determine if they are equivalent.

32. A method for transmitting data in a secure manner from a first microprocessor based device to a second microprocessor based device, subsequent to issuance of said second microprocessor based device, comprising the steps of:

encrypting one or more portions of said data at said first device using one or more transfer keys for each portion, each portion including an associated location, said data including an executable application;

encrypting said one or more transfer keys and said one or more associated locations with a second key at said first device;

forming a key transformation unit which comprises said one or more encrypted transfer keys and said one or more encrypted associated locations;

transmitting said data and said key transformation unit to said second device;

decrypting said key transformation unit at said second device to recover said one or more transfer keys and said one or more associated locations of said respective one or more encrypted portions;

identifing said encrypted application portions associated with said recovered associated locations;

decrypting said one or more encrypted portions of said data on said second device using the recovered transfer key for each encrypted portion; and storing said data in memory of said second microprocessor based device for subsequent execution.

33. The method of claim 32, wherein said second key is from a public key and private key set used in asymmetric encryption.

34. The method of claim 32, wherein said key transformation unit further indicates the technique used to encrypt said one or more portions of said executable application.

35. The method of claim 32, further comprising the step of enciphering a second portion of said application independently of said one or more portions of said executable application.

36. The method of claim 35, wherein said second portion is encrypted using a second encryption technique and said key transformation unit indicates said second encryption technique.

37. The method of claim 35, wherein said second portion is encrypted using a second key and said key transformation unit indicates said second key.

38. The method of claim 35, wherein said key transformation unit indicates the location of said second portion of said application.

39. The method of claim 32, wherein said key transformation unit indicates the one or more associated locations of said one or more portions of said executable application.

40. The method of claim 32, further including the steps of providing a public key and secret key set for an application provider; providing a public and secret key set for a certification authority; signing said application provider's public key using said certificate authority's secret key to produce an application load certificate; further signing said encrypted application using said application provider's secret key to produce a signed encrypted application and transmitting said signed application and said application load certificate to said IC card.

41. A method for processing a data transmission, comprising the steps of:

receiving said data transmission comprising an executable application encrypted with a first key and a key transformation unit encrypted with a second key, wherein said key transformation unit comprises said first key, said executable application including one or more encrypted portions and one or more locations associated with said one or more encrypted portions;

decrypting said key transformation unit on an IC card to recover said first key and said one or more associated locations;

identifing said encrypted application portions associated with said one or more recovered associated locations;

decrypting said one or more encrypted portions of said executable application one said IC card using said first key for each encrypted portion; and storing said decrypted executable application in memory of said IC card for subsequent execution.

42. The method of claim 41, wherein said second key is from a public key and private key set used in asymmetric encryption.

43. The method of claim 41, wherein said key transformation unit further indicates the technique used to encrypt said one or more portions of said executable application.

44. The method of claim 41, further comprising the step of enciphering a second portion of said application independently of said one or more portions of said executable application.

45. The method of claim 44, wherein said second portion is encrypted using a second encryption technique and said key transformation unit indicates said second encryption technique.

46. The method of claim 44, wherein said second portion is encrypted using a second key and said key transformation unit indicates said second key.

47. The method of claim 44, wherein said key transformation unit indicates the location of said second portion of said application.

48. The method of claim 41, wherein said key transformation unit indicates the one or more associated locations of said one or more portions of said executable application.

49. The method of claim 41, further including the steps of providing a public key and secret key set for an application provider; providing a public and secret key set for a certification authority; signing said application provider's public key using said certificate authorities' secret key to produce an application load certificate; further encrypting said encrypted application using said application provider's secret key to produce a signed encrypted application and transmitting said signed application and said application load certificate to said IC card.

50. The method of claim 49, further including the step of the IC card verifying said application load certificate with said certification authority's public key.

51. The method of claim 50, further including the steps of verifying the signed encrypted application using the application provider's public key from said verified application load certificate.

52. The method of claim 51, wherein said verified application signature is compared to said encrypted application to determine if they are equivalent.

53. An apparatus for processing a data transmission, comprising:

means for receiving said data transmission comprising an executable application encrypted with a first key and a key transformation unit encrypted with a second key, wherein said key transformation unit comprises said first key, said executable application including one or more encrypted portions and one or more locations associated with said one or more encrypted portions;

means for decrypting said key transformation unit on an IC card to recover said first key;

means for identifying said encrypted application portions associated with said one or more recovered associated locations;

means for decrypting said one or more encrypted portions of said executable application one said IC card using said first key for each encrypted portion; and means for storing said decrypted executable application in memory of said IC card for subsequent execution.

54. The apparatus of claim 53, wherein said second key is from a public key and private key set used in asymmetric encryption.

55. The apparatus of claim 53, wherein said key transformation unit further indicates the technique used to encrypt said one or more portions of said executable application.

56. The apparatus of claim 53, further including means for enciphering a second portion of said executable application exclusive of said one or more portions of said executable application.

57. The apparatus of claim 56, wherein said second portion is encrypted using a second encryption technique and said key transformation unit indicates said second encryption technique.

58. The apparatus of claim 56, wherein said second portion is encrypted using a second key and said key transformation unit indicates said second key.

59. The apparatus of claim 56, wherein said key transformation unit indicates the location of said second portion of said application.

60. The apparatus of claim 53, wherein said key transformation unit indicates the one or more associated locations of said one or more portions of said executable application.

61. The apparatus of claim 56, further comprising:

a certification authority arrangement providing a respective public key; and means for verifying an application load certificate using the certification authority arrangement's public key.

62. The apparatus of claim 61, further including means for verifying the signed encrypted application using an application provider's public key located in said verified application load certificate.

63. The apparatus of claim 62, wherein said verified application signature is compared to the said encrypted application to determine if they are equivalent.

64. The method of claim 1, wherein said executable application is transmitted to said IC card subsequent to the issuance of said IC card.

65. The method of claim 9, wherein said second portion is encrypted using the same encryption technique as said first portion.

66. The method of claim 10, wherein said second portion is positioned following said first portion.

67. The system of claim 23, wherein said second portion is encrypted using the same encryption technique as said first portion.

68. The system of claim 24, wherein said second portion is positioned following said first portion.

69. The method of claim 37, wherein said second portion is encrypted using the same encryption technique as said first portion.

70. The method of claim 38, wherein said second portion is positioned following said first portion.

71. The method of claim 46, wherein said second portion is encrypted using the same encryption technique as said first portion.

72. The method of claim 47, wherein said second portion is positioned following said first portion.

73. The apparatus of claim 58, wherein said second portion is encrypted using the same encryption technique as said first portion.

74. The apparatus of claim 59, wherein said second portion is positioned following said first portion.

* * * * *

UNITED STATES PATENT AND TRADEMARK OFFICE
CERTIFICATE OF CORRECTION

PATENT NO.    : 6,385,723 B1
DATED         : May 7, 2002
INVENTOR(S)   : Timothy Philip Richards It is certified that error appears in the above-identified patent and that said Letters Patent is hereby corrected as shown below:

<u>Title page,</u>
Item [56], References Cited, FOREIGN PATENT DOCUMENTS,
"EP WO9116691 10/1991" should read -- WO WO9116691 10/1991 --
Insert -- JP 2592856 12/1996 Japan
      JP 64-81084 3/1989 Japan --

<u>Column 4,</u>
Line 37, "needs" should read -- need --

<u>Column 8,</u>
Line 14, "mkd__pk c" should read -- mkd__pk__c --
Line 54, "associate" should read -- associated --
Line 59, "__discriptors" should read -- __descriptors --

<u>Column 10,</u>
Line 37, "providers" should read -- provider's --

<u>Column 11,</u>
Line 19 "by" should read -- be --

<u>Column 12,</u>
Line 27, "need" should read -- needed --

<u>Column 13,</u>
Line 27, "certificate" should read -- certification --; and
"authorities' " should read -- authority's --
Line 58, "each," should read -- each portion, --

<u>Column 14,</u>
Line 51, "certificate" should read -- certification --

<u>Column 15,</u>
Line 22, "identifing" should read -- identifying --

UNITED STATES PATENT AND TRADEMARK OFFICE
CERTIFICATE OF CORRECTION

PATENT NO. : 6,385,723 B1
DATED : May 7, 2002
INVENTOR(S) : Timothy Philip Richards It is certified that error appears in the above-identified patent and that said Letters Patent is hereby corrected as shown below:

Column 16,
Line 8, "identifing" should read -- identifying --
Line 11, "one" should read -- on --
Line 13, "memory" should read -- said memory --
Line 42, "certificate" should read -- certification --; and "authorities' " should read -- authority's --

Column 17,
Line 7, "one" should read -- on --
Line 10, "memory" should read -- said memory --

Signed and Sealed this

Twenty-first Day of January, 2003

JAMES E. ROGAN
*Director of the United States Patent and Trademark Office*